Sept. 24, 1940. T. H. SMOOT 2,215,941
AIR VOLUME REGULATOR AND CONTROL FOR FLUID FUEL BURNERS
Filed Aug. 30, 1939 2 Sheets-Sheet 1

Inventor
T. H. Smoot.
By
Attorney

Sept. 24, 1940.  T. H. SMOOT  2,215,941
AIR VOLUME REGULATOR AND CONTROL FOR FLUID FUEL BURNERS
Filed Aug. 30, 1939  2 Sheets-Sheet 2
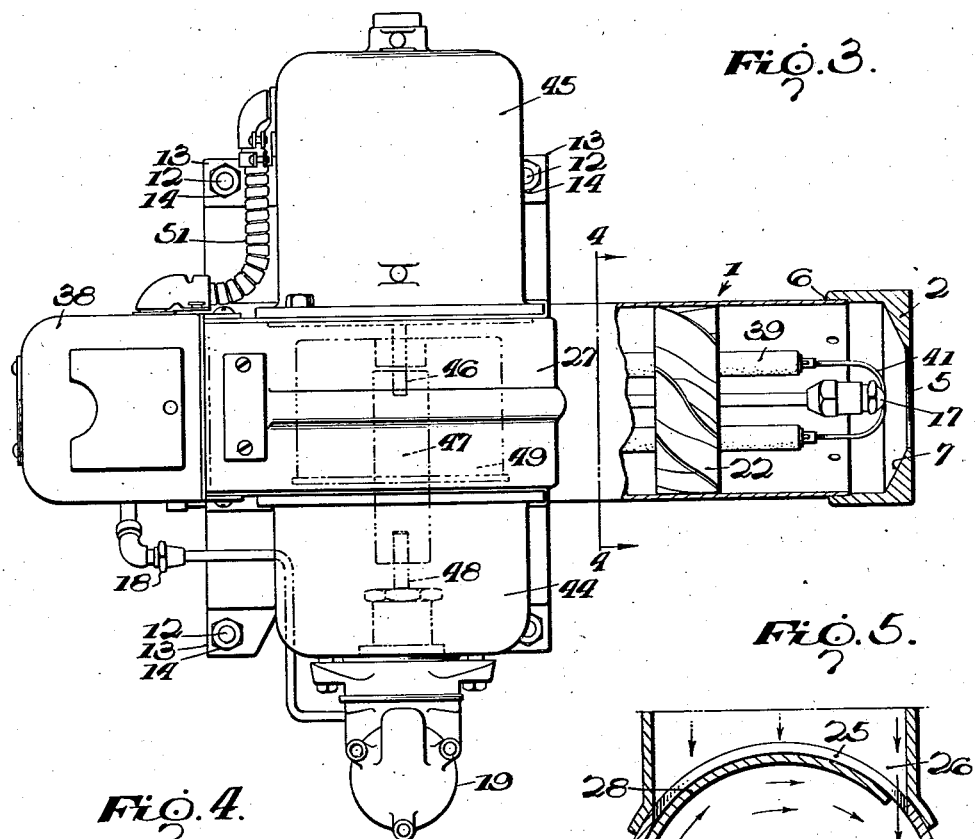
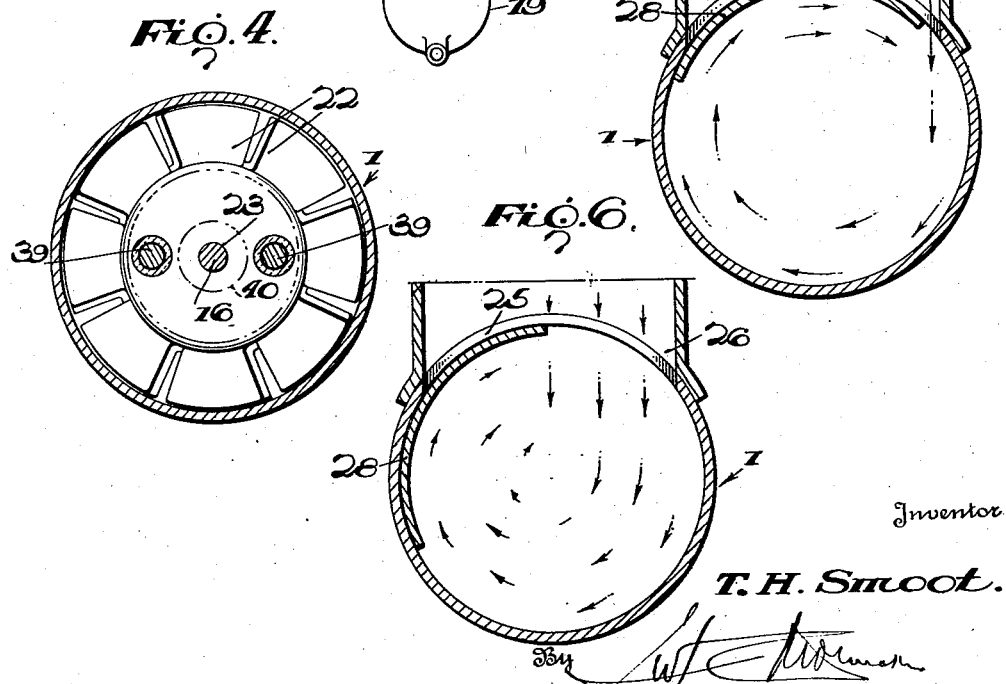
Inventor
T. H. Smoot.
By
Attorney Patented Sept. 24, 1940

2,215,941

UNITED STATES PATENT OFFICE 2,215,941

AIR VOLUME REGULATOR AND CONTROL FOR FLUID FUEL BURNERS

Theophilus H. Smoot, Baltimore, Md., assignor to Anchor Post Fence Company, Baltimore, Md., a corporation of Maryland Application August 30, 1939, Serial No. 292,751

4 Claims. (Cl. 158—76)

The invention relates to an air delivery and control for fluid fuel burners.

An object of the present invention is to provide a simple, practical and efficient fluid fuel burner including a fuel spray nozzle and means for enveloping the fuel spray from the nozzle in a helically discharged rotating envelope of air having sufficient turbulence for causing fine misty oil spray or other fuel spray and air to commingle intimately and thoroughly mix.

A further object of the invention is to provide a fluid fuel burner including a nozzle for the discharge of fluid fuel and equipped with helical air directing passages and adapted to deliver air to said passages under sufficient pressure and velocity to impart to the air the desired rotating motion for producing the necessary turbulence of flow for intimately mixing the air and fuel spray.

It is also an object of the invention to provide a fluid fuel burner including a fuel discharging nozzle and fixed helical passages for imparting to the air passing through such passages the desired directional rotation enveloping the fuel spray from the nozzle in a rotating envelope of air and to enable the volume of air to be reduced when the feed of the fuel is reduced without reducing the pressure and velocity of the air delivered to the passages and without varying the cross-sectional area of the passages to maintain the velocity and pressure of the air passing through the passages.

Another object of the invention is to equip a fluid fuel burner having a blast tube, a nozzle and fixed passages, with means for imparting to the air introduced into the blast tube a rotating motion, so that centrifugal force will maintain the air against the wall of the blast tube and cause the air to travel in a thin sheet along the wall of the blast tube and circumferentially around the same, so that in this manner substantially no air will be moved in the center of the tube away from the wall from the fan to the discharge opening at the burner nose. The greater the rotating motion imparted to the air delivered to the blast tube the less effective will be the area away from the tube wall and in the space within the sheet of air maintained by centrifugal force in contact with the wall of the tube in its travel from the fan to said passages. It has been found that the effective area through which the air is moving in a burner tube can be reduced in proportion to the extent to which the air is made to move in a thin sheet along the cylindrical walls of the tube, and this will enable the volume of air delivered to the blast tube by the fan to be correspondingly reduced when the feed of the fuel is reduced and without reducing the velocity of the air passing through the fixed helical passages, so that the velocity of the air and the direction thereof may be maintained without varying the cross-sectional area of the passages.

A further object of the invention is to provide means operable exteriorly of the fluid fuel burner for adjusting the air regulating and controlling means to proportion the air properly to the amount of fuel being fed to the burner.

With these and other objects in view, the invention consists in the construction and novel combination and arrangement of parts hereinafter fully described, illustrated in the accompanying drawings and pointed out in the claims hereto appended, it being understood that various changes in the form, proportions and minor details of construction may be resorted to without departing from the spirit or sacrificing any of the advantages of the invention.

In the drawings:

Figure 3 is a plan view of the oil burner partly in section.

Figure 4 is a detail transverse sectional view taken substantially on the line 4—4 of Figure 3.

Figure 5 is a detail transverse sectional view taken substantially on the line 5—5 of Figure 2 and showing the air regulating and controlling valve member in position for admitting substantially a minimum amount of air to the blast tube.

Figure 6 is a similar view showing the air regulating and controlling valve member arranged for introducing substantially a maximum amount of air into the blast tube.

Figures 1, 2:
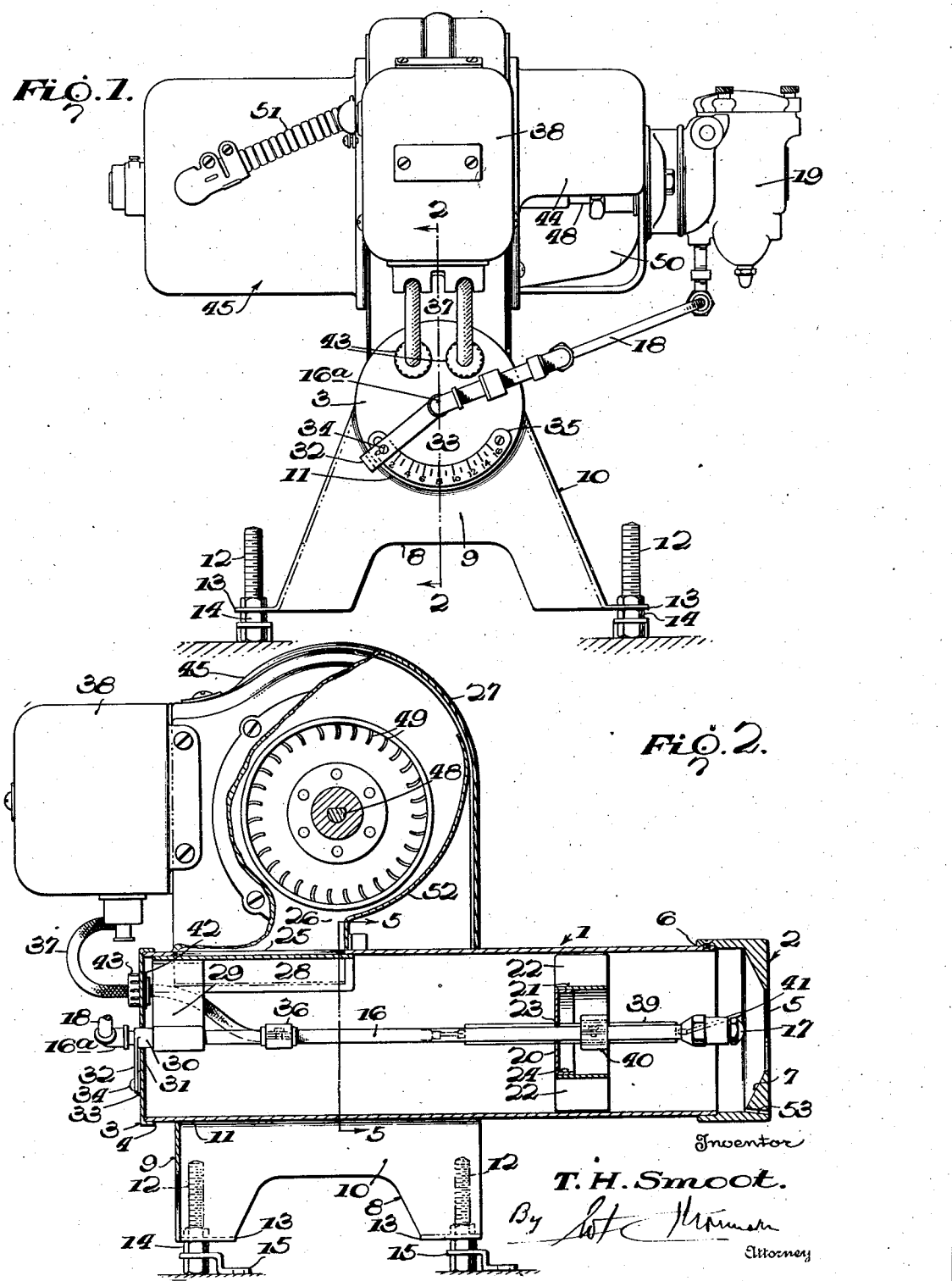
Figure 1 is an end elevation of an oil burner constructed in accordance with this invention.
Figure 2 is a longitudinal sectional view of the same partly in elevation, the section being taken on the line 2—2 of Figure 1.

In the accompanying drawings in which is illustrated the preferred embodiment of the invention, the oil burner comprises in its construction a horizontally disposed cylindrical blast tube 1 constructed substantially as that shown and described in my copending application filed by me on or about July 10, 1939, Serial No. 283,662. The blast tube 1 is provided at its front end with a nose 2 and has its rear end closed by a circular cap or cover 3 provided at its periphery with an annular flange 4 which is fitted over the rear end of the blast tube and detachably secured to the same by any suitable means adapted to permit the cover and the associated parts to be readily removed as a unit.

The blast tube may be constructed of any suitable material and the nose 2, which consists of a cylindrical section, is preferably in the form of a casting provided at the front with an opening 5 and having at its inner end an interior annular recess 6 which receives the front end of the body portion of the blast tube. The nose 2 is secured to the blast tube 1 in any suitable manner.

The nose is provided with an interior annular surface 7 radially inclined to the axis of the tube and extending from the cylindrical portion of the nose to the opening 5 forming an outwardly tapering outlet. The blast tube is mounted at its rear portion upon an upwardly tapered support 8 composed of inclined side portions 10 and a transverse connecting front portion 9, which is provided at the top with a recess 11 receiving and conforming to the configuration of the blast tube, as clearly illustrated in Figure 1 of the drawings. The sides and front connecting portions are recessed to provide a leg formation. The support 8 may be secured to the blast tube in any suitable manner.

The leg portions of the support 8 are provided with vertical screws 12 piercing laterally extending, horizontally disposed flanges 13 of the support and adjustably secured to the same by nuts 14. The screws 12, which are provided at their lower ends with heads, are anchored to the supporting surface by means of clamps 15, but any other suitable means may be employed for mounting the screws on the surface upon which the oil burner may be placed.

Within the blast tube is arranged a horizontally disposed fuel pipe 16 provided at its front end with a nozzle 17 and extending rearwardly from a point rearwardly spaced from the opening 5 through the rear end of the blast tube and provided exteriorly of the same with an elbow 16a which connects the fuel pipe 16 with the pump line 18 of a centrifugal pump 19. The centrally arranged horizontal fuel pipe 16 is supported within the blast tube by the air directing means which forms the helical air directing passages for causing the air to envelope the oil or other fuel spray of the nozzle in a helically discharged rotating envelope of air having sufficient turbulence for causing the fine misty oil spray or other fuel spray and air to commingle intimately and thoroughly mix.

The air directing device comprises a central annular support 20, a cylindrical member 21 and an annular series of blades or vanes having helicoidal surfaces defining helical passages therebetween. The annular support 20 consists of a disk having a central opening 23 to receive the fuel pipe 16 and an annular peripheral flange 24 arranged in spaced relation with the inner surface of the blast tube. The cylindrical member 21, which is arranged coaxial with and in spaced relation to the blast tube, is suitably secured at its rear end to the peripheral flange 24 of the annular support 20 and it extends forwardly therefrom.

The helically arranged blades 22 extend radially from the cylindrical member 21 to the inner surface of the blast tube and are suitably secured at their inner longitudinal edges to the said cylindrical member and are preferably coextensive in length with the same. These blades form helical passages for the air and the velocity of the air impinging against the helicoidal surfaces of the blades 22 imparts to the air a rotating or spinning motion which will cause the air to envelope the oil or other fuel spray from the nozzle 17 and induce so much turbulence of flow that the fine misty oil spray or other fuel spray and air are intimately mixed.

In the aforesaid application the pressure and the velocity of the air are maintained at the passages by varying the effective cross-sectional area of the same to compensate for variations in the volume of air due to adjusting the volume of air to correspond with fuel adjustments of the burner. In the present invention, however, the passages have a fixed cross-sectional area and the velocity and pressure of the air are maintained at the passages by the means hereinafter described for permitting the volume of air to be regulated and controlled to suit fuel adjustments of the burner.

The blast tube 1 is provided at its rear end with a top opening 25 which coincides with the outlet 26 of a volute fan casing 27 mounted upon the rear portion of the blast tube and suitably secured to the same. The effective size of the outlet of the fan is controlled and varied by means of an arcuate plate or valve member 28 fitted against the inner face or wall of the blast tube and having a length slightly in excess of the length of the top opening 25 and suitably secured to a radially arranged supporting arm 29 consisting of a plate or member located at the rear end of the arcuate valve member and suitably secured at its inner end to a hub 30 consisting of a sleeve extending outwardly through a central opening 31 in the cap or cover of the blast tube and journaled in the said opening and provided exteriorly of the blast tube with an operating arm 32.

The tubular hub 30 has a bore or opening of sufficient size to permit the fuel pipe 16 to pass through it and to afford sufficient clearance so that the fuel pipe will not interfere with the ready adjustment of the operating arm to position the arcuate valve member properly with relation to the outlet of the fan for permitting the desired or necessary amount of air from the fan to enter the blast tube to correspond with fuel adjustments of the burner. The operating arm 32 is movable over a scale 33 and it is secured in its adjustment by means of a set screw 34 mounted on the operating arm and arranged to engage the scale plate 35 or other fixed portion of the blast tube. The scale plate 35, which is suitably secured to the cap or cover of the blast tube, is provided with graduations to form the air setting scale 33 so that the arcuate valve member may be accurately positioned and securely retained in any adjustment.

In Figure 5 of the drawings the arcuate valve member 28 is shown substantially at a minimum adjustment, while in Figure 6 of the drawings the valve member is in substantially its maximum adjustment and it will be readily understood that the valve member may be arranged in any intermediate position for controlling the air entering the blast tube and for delivering to the same only the desired amount of air corresponding to the fuel adjustment of the burner. The air entering the blast tube from the fan casing, as indicated by the arrows in Figures 5 and 6 of the drawings, is caused to travel circumferentially around the blast tube at a high velocity, which results in the centrifugal action causing the air to travel circumferentially around the blast tube in contact with the wall thereof in a relatively thin sheet, according to the effective size of the outlet opening of the fan casing. This produces a rotation or whirling action of the air as it moves longitudinally of the blast tube from the outlet of the fan casing to the passages, and the direction of rotation of the air circumferentially around the blast tube in its passage to the passages is in the same direction as the spinning or rotary directional motion imparted to the air by the helical passages, so that the air passing through these passages is not checked or retarded by any change in the direction of rotation.

The purpose of imparting rotation to the air at the point where it is delivered into the blast tube is not to impart to the air the required direction for mixing the air with the oil spray or other fluid fuel spray, but is for the purpose of causing the air to hug the wall of the blast tube in rotating within the same, so that the velocity of the air is maintained at a high value. By this process the air reaches the helical surfaces of the fixed blades at high velocity and in a thin sheet, with the result that the air is confined in its passage through the spaces between the blades to only a portion of the area next to the wall of the blast tube. Therefore, the air does not expand through the whole area of the passages but has its velocity maintained through using only a part of the cross-sectional area of the passages. The result is that the air leaves the helically arranged passages at the same high velocity at which it entered the same. Consequently the air leaving the passages has the velocity to maintain the direction imparted to it and the resulting air stream has the necessary velocity to penetrate the oil or other fluid fuel spray and the necessary direction to produce the desired turbulence and intimacy of the mixture between the air and the oil spray or other fluid fuel spray.

The motion imparted to the air at the fan outlet is in the same direction as the direction of rotation imparted to the air by the passages. This prevents stopping or checking the air rotation at any point and consequently maintains the air stream against the tube wall throughout the entire travel of air from the volume regulator to the discharge at the burner nose. It also prevents any energy conversion loss which would result from changing the direction of the air as would be the case if the volume regulator and passages produced different directions of rotation.

It will be noted that the rotative effect produced by the air regulator or control is the greatest when the least air is flowing. This is the result desired because in this way the least volume of air is subjected to the greatest confinement at the wall of the blast tube and consequent conservation of velocity. In this way the disadvantage of a fixed area is overcome by confining the air in its delivery to the passages, so that air circulating through only a fractional part of the total helical area takes place. As the volume of circulating air increases, the confinement of the air in a zone adjacent the walls of the blast tube due to rotation and centrifugal force decreases, but this is compensated for by the greater volume of the moving air which fills more of the cross-sectional area of the helical passages and thereby maintains its velocity. By means of the air volume regulator and control imparting rotary motion to the air delivered to the blast tube, the velocity of the air is maintained substantially constant in the passages with the result that a constant degree of spray penetration and a constant degree of turbulence for intimacy of mixture are maintained without mechanical or equivalent means for varying the effective cross-sectional area of the passages.

Mounted on the fuel tube at the rear portion thereof is a cable support 36 which is preferably in the form of a clamp and which receives cables 37 extending from a transformer 38 to right and left-hand electrodes 39 located at opposite sides of the front portion of the fuel tube. The electrodes are supported by an electrode holder 40 mounted on the fuel tube and extending from opposite sides thereof and having side clamps for holding the electrodes. Any suitable form of electrode holder may be employed, and the electrodes are provided with inclined terminals 41 extending upwardly and forwardly and spaced apart above the front end of the nozzle and adapted to produce sparks for igniting fuel in the usual manner.

The cables 37 extend through the upper portion of the cover 3 at opposite sides thereof and are provided with insulating bushings 42 having heads at their inner ends and provided at their outer ends with clamping nuts 43 for drawing the heads of the bushings tightly into clamping engagement with the inner face of the cover 3, whereby the bushings and the cables are firmly supported on the cover 3. When the cover is unfastened from the rear end of the blast tube, the fuel pipe, the air regulator or control, the electrodes and the associated parts may be removed as a unit and the said parts constitute a combustion unit which may be readily placed within the blast tube and removed therefrom.

The pump is located at one side of the fan casing and is connected therewith by means of a pump supporting bracket 44. Secured to the opposite side of the fan casing is an electric motor 45 having a motor shaft 46 extending into the fan casing and connected by a suitable coupling 47 with the shaft 48 of the pump 19. The coupling 47, which is preferably in the form of a flexible cylindrical member or shaft section, extends through a portion of a fan 49 which is secured to motor shaft 46 and operates in the volute fan casing 27. The pump bracket, which is preferably in the form of a housing, is open at the bottom and closed at the top and sides and is arranged over an inlet opening 50 formed in the side wall of the fan casing at the pump side of the same. The motor and the transformer are bolted or otherwise secured to the fan casing and the transformer junction space is connected by a section 51 of Greenfield cable or other suitable means with the feed wires, not shown, for supplying the motor with electric current.

The fan casing 27 is provided at its lower portion with a curved cut-off plate 52 extending upwardly from the front end of the air receiving opening in the top of the blast tube 1 and secured at its upper end to the upper portion of the fan casing adjacent the inlet opening of the fan casing. The cut-off plate 52 gradually curves downwardly toward the fan and constricts the air passage leading to the outlet of the fan, which is adapted to supply to the blast tube air having the desired velocity and volume, and is capable of maintaining a steady uniform air pressure within the blast tube. The volume of air and the amount of fuel supplied to the oil burner may be controlled in the usual manner and the air regulator or control is capable of accurate adjustment for varying the size of the fan outlet, so that the rotative effect produced by the discharge of the fan will increase as the volume of air discharged from the fan decreases, so that the velocity and pressure of the air at the fixed passages will be maintained as hereinbefore fully explained.

The blast tube is provided at the bottom of the nose 2 with a drain opening 53 which may be formed in the nose 2 as clearly illustrated in Figure 2 of the drawings, but the drain opening may be provided at any other desired point as will be readily understood.

The burner of the present invention is not only designed and adapted for burning oil as a fuel, but gas or any other analogous fluid fuel may be used.

What is claimed is:

1. In a fluid fuel burner, in combination, a blast tube having an air receiving opening, a fuel pipe located within the blast tube and provided with a nozzle, an air directing device provided with a series of helical passages surrounding the fuel pipe to impart rotary motion to air passing through the air directing device, a fan having an outlet located at the air receiving opening of the blast tube and arranged to discharge air into the blast tube against the wall thereof transversely of the blast tube for imparting rotary motion to the air whereby the latter is caused by centrifugal force to hug the wall of the blast tube and move in a sheet with high velocity and pressure to the air directing device, and a valve member for varying the effective size of the air receiving opening of the blast tube and the thickness of the sheet of rotating air.

2. In a fluid fuel burner, in combination, a blast tube having an air receiving opening, a fuel pipe located within the blast tube and provided with a nozzle, an air directing device provided with a series of helical passages surrounding the fuel pipe to impart rotary motion to air passing through the air directing device, a fan having an outlet located at the air receiving opening of the blast tube and arranged to discharge air into the blast tube against the wall thereof transversely of the blast tube for imparting rotary motion to the air whereby the latter is caused by centrifugal force to hug the wall of the blast tube and move in a sheet with high velocity and pressure to the air directing device, and an arcuate valve member movable over the wall of the blast tube for varying the effective size of the air receiving opening of said tube and the thickness of the sheet of rotating air.

3. In a fluid fuel burner, in combination, a blast tube having an air receiving opening, a fuel pipe located within the blast tube and provided with a nozzle, an air directing device provided with a series of helical passages surrounding the fuel pipe to impart rotary motion to air passing through the air directing device, a fan having an outlet located at the air receiving opening of the blast tube and arranged to discharge air into the blast tube against the wall thereof transversely of the blast tube for imparting rotary motion to the air whereby the latter is caused by centrifugal force to hug the wall of the blast tube and move in a sheet with high velocity and pressure to the air directing device, an arcuate valve member movable over the wall of the blast tube for varying the effective size of the air receiving opening of said tube and the thickness of the sheet of rotating air, a hub mounted for rotary movement on the blast tube and having means for supporting the valve member, and operating mechanism connected with the hub for adjusting the valve member.

4. In a fluid fuel burner, in combination, a blast tube having an air receiving opening, a fan having an outlet located at the air receiving opening of the blast tube and arranged to discharge air into the blast tube against the wall thereof in a direction transversely of the same for imparting to the air rotary motion whereby the air is caused by centrifugal force to hug the wall of the blast tube and move forwardly in a rotating sheet with high velocity and pressure, an arcuate valve member for varying the effective size of the air receiving opening of the blast tube and the thickness of the sheet of rotating air, means for mounting the valve member in the blast tube, means for operating the valve member positioned exteriorly of the blast tube and a fuel pipe extending into the blast tube and provided with a nozzle.

THEOPHILUS H. SMOOT.